United States Patent
Galelli Christmann et al.

(10) Patent No.: US 12,162,149 B2
(45) Date of Patent: Dec. 10, 2024

(54) TRANSITION METHOD OF LOCOMOTION GAIT OF ROBOT

(71) Applicants: Inventec (Pudong) Technology Corporation, Shanghai (CN); INVENTEC CORPORATION, Taipei (TW)

(72) Inventors: Guilherme Henrique Galelli Christmann, Taipei (TW); Jonathan Hans Soeseno, Taipei (TW); Ying-sheng Luo, Taipei (TW); Wei-Chao Chen, Taipei (TW)

(73) Assignees: Inventec (Pudong) Technology Corporation, Shanghai (CN); Inventec Corporation, Taipei (TW)

( * ) Notice: Subject to any disclaimer, the term of this patent is extended or adjusted under 35 U.S.C. 154(b) by 185 days.

(21) Appl. No.: 18/084,890

(22) Filed: Dec. 20, 2022

(65) Prior Publication Data

US 2024/0157548 A1     May 16, 2024

(30) Foreign Application Priority Data

Nov. 11, 2022   (CN) .......................... 202211409215.X

(51) Int. Cl.
*B25J 9/00*     (2006.01)
*B25J 9/16*     (2006.01)
*G05B 19/4155*  (2006.01)

(52) U.S. Cl.
CPC ............. *B25J 9/161* (2013.01); *B25J 9/1605* (2013.01); *G05B 19/4155* (2013.01); *G05B 2219/50391* (2013.01)

(58) Field of Classification Search
CPC .......... B25J 9/161; B25J 9/1605; B25J 9/163; G05B 19/4155; G05B 2219/50391; B62D 57/032
See application file for complete search history.

(56) References Cited

U.S. PATENT DOCUMENTS

2023/0329585 A1 * 10/2023 Huang ................. A61B 5/4595
2024/0257975 A1 *  8/2024 Huang ................. A61B 5/1121

* cited by examiner

*Primary Examiner* — Ian Jen
(74) *Attorney, Agent, or Firm* — Locke Lord LLP; Tim Tingkang Xia, Esq.

(57) ABSTRACT

A transition method of locomotion gait of a robot includes: executing a deployment procedure multiple times, each execution includes: randomly selecting a source policy and a destination policy, simulating a transition operation from the source policy to the destination policy, and recording a transition configuration and a transition result to a transition database, where each policy is a neural network model, and a latent state in the transition configuration is a hidden layer of the neural network model of the source policy. The method further includes: training a transition-net according to the transition database, and performing the following steps by a meta-controller disposed on the robot: selecting two gait policies as an active policy and a queued policy, executing the active policy, inputting the two policies to the transition-net to obtain a success probability, and when the success probability is greater than a threshold, executing the queued policy.

7 Claims, 4 Drawing Sheets

TRANSITION METHOD OF LOCOMOTION GAIT OF ROBOT

CROSS-REFERENCE TO RELATED APPLICATIONS

This non-provisional application claims priority under 35 U.S.C. § 119(a) on Patent Application No(s) 202211409215.X filed in China on Nov. 11, 2022, the entire contents of which are hereby incorporated by reference.

BACKGROUND

1. Technical Field

The present disclosure relates to machine learning, locomotion gait simulation, and robot control, and more particular to a transition method of locomotion gait of robot.

2. Related Art

The applications of robots and automation in the industry have grown tremendously in recent years. With better hardware and more accurate sensors, the potential uses of robots are numerous. In the subareas of general navigation and exploration, a special interest has been placed in legged robots, which hold the promise of handling challenging terrain and dynamic environments.

Successful and reliable legged locomotion requires a high degree of versatility and robustness. A versatile legged robot should employ multiple locomotion gaits to produce footsteps sequences that can handle a multitude of scenarios while remaining stable. For example, when moving from flat ground to uneven terrain, or to climb a flight of stairs, the foot trajectories need to be optimized to the immediate environment to avoid collapse. Additionally, each gait can produce different characteristics such as moving at slow or fast speeds, as well as stylistic properties such as moving like a dog, or like a cat.

However, current methods commonly employ multiple locomotion gaits by way of combination. This is usually done in a hierarchical manner, with low-level controllers that specialize in different gaits trained in tandem with a high-level controller. This tight coupling of high and low-level controllers suffers from limited scalability. Adding a new gait to an existing library requires the retraining of both low-level and high-level controllers, affecting already existing gaits, and increasing the time cost and computation power cost.

SUMMARY

The present disclosure enables the creation of a large library of locomotion gaits, in a scalable and iterative manner. The control mechanism proposed by the present disclosure is able to regulate and execute transitions between gait pairs available in the library. The present disclosure facilitates the deployment of any number of specialized gaits with legged robots in the real-world.

According to an embodiment of the present disclosure, a transition method of locomotion gait of a robot is proposed. The robot has a plurality of joints and a meta-controller, and the method includes following steps: performing, by a computing device, a deployment procedure for a plurality of times, wherein each of the plurality of times comprises: randomly selecting two of a plurality of gait policies as a source policy and a destination policy, wherein each of the plurality of gait policy is a neural network model used to control the robot to perform a periodic motion with a plurality of phases; and simulating a transition operation from the source policy and the destination policy and recording a transition configuration and a transition result in a transition database, wherein the transition configuration comprises: an identifier of the source policy, an identifier of the destination policy, a latent state and one of the plurality of phases associated with the destination policy, and the latent state is a hidden layer of the neural network model corresponding to the source policy; training, by the computing device, a transition-net according to the transition database, wherein the transition-net is used to output a success probability according to the transition configuration; and performing, by the meta-controller, a plurality of operations, wherein the plurality of operations comprises: selecting two of the plurality of gait policies as an activate policy and a queued policy; executing the activate policy to drive the robot; inputting the activate policy and the queued policy to the transition-net to obtain the success probability; and when the success probability is greater than a threshold, executing the queues policy to drive the robot.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present invention. The following embodiments further illustrate various aspects of the present invention, but are not meant to limit the scope of the present invention.

The goal of the present disclosure is to enable real-world quadruped robots to incrementally expand their library of locomotion gaits without altering previously learned ones. An embodiment of the present disclosure contains the complexity of the gaits by training independent policies that specialize in a particular gait. An embodiment of the present disclosure constructs a library of robust policies that can transfer to real world robots with the use of domain randomization (DR). An embodiment of the present disclosure introduces a transition mechanism to link the independent policies by instantaneously switching between any two arbitrary policies. To reliably identify transition configurations that yield successful outcomes, an embodiment of the present disclosure proposes a transition strategy name transition-net, that uses the latent representations of the locomotion policies. During deployment with a real-world quadruped robot, an embodiment of the present disclosure constructs a meta-controller that executes policies available in the library and regulates the switch between an active and a queued policy using the transition strategy proposed in the embodiment of the present disclosure.

Figure 1:
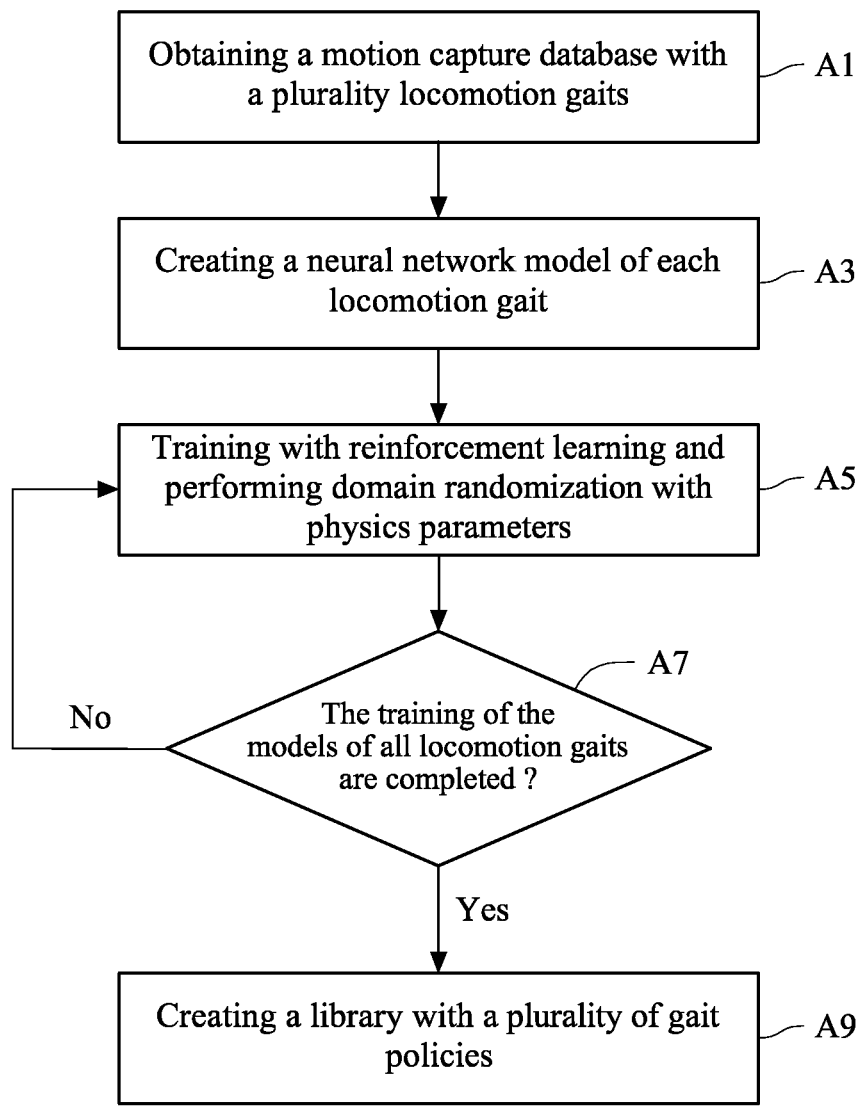
FIG. 1 is a flowchart of creating a library of independent locomotion policies according to an embodiment of the present disclosure.

FIG. 1 is a flowchart of creating a library of independent locomotion policies according to an embodiment of the present disclosure, and includes steps A1 to A9 performed by a computing device. Step A1 is to obtain a motion capture database with a plurality locomotion gaits. Step A3 is to create a neural network model of each locomotion gait. The motion capture database includes a plurality of motion capture data.

A legged robot (the following descriptions take the quadruped robot as an example) moves through gaits. The gait refers to a periodic sequence of foot contacts with the ground. To enable a wide skill repertoire for the robot, an embodiment of the present disclosure uses a motion imitation framework to learn gait policies in simulation from a reference motion. In an embodiment, using information from motion capture data from real animals, the agent is conditioned to simultaneously imitate a reference clip and execute a goal oriented task. The agent refers to a robot simulated in software.

Figure 2:
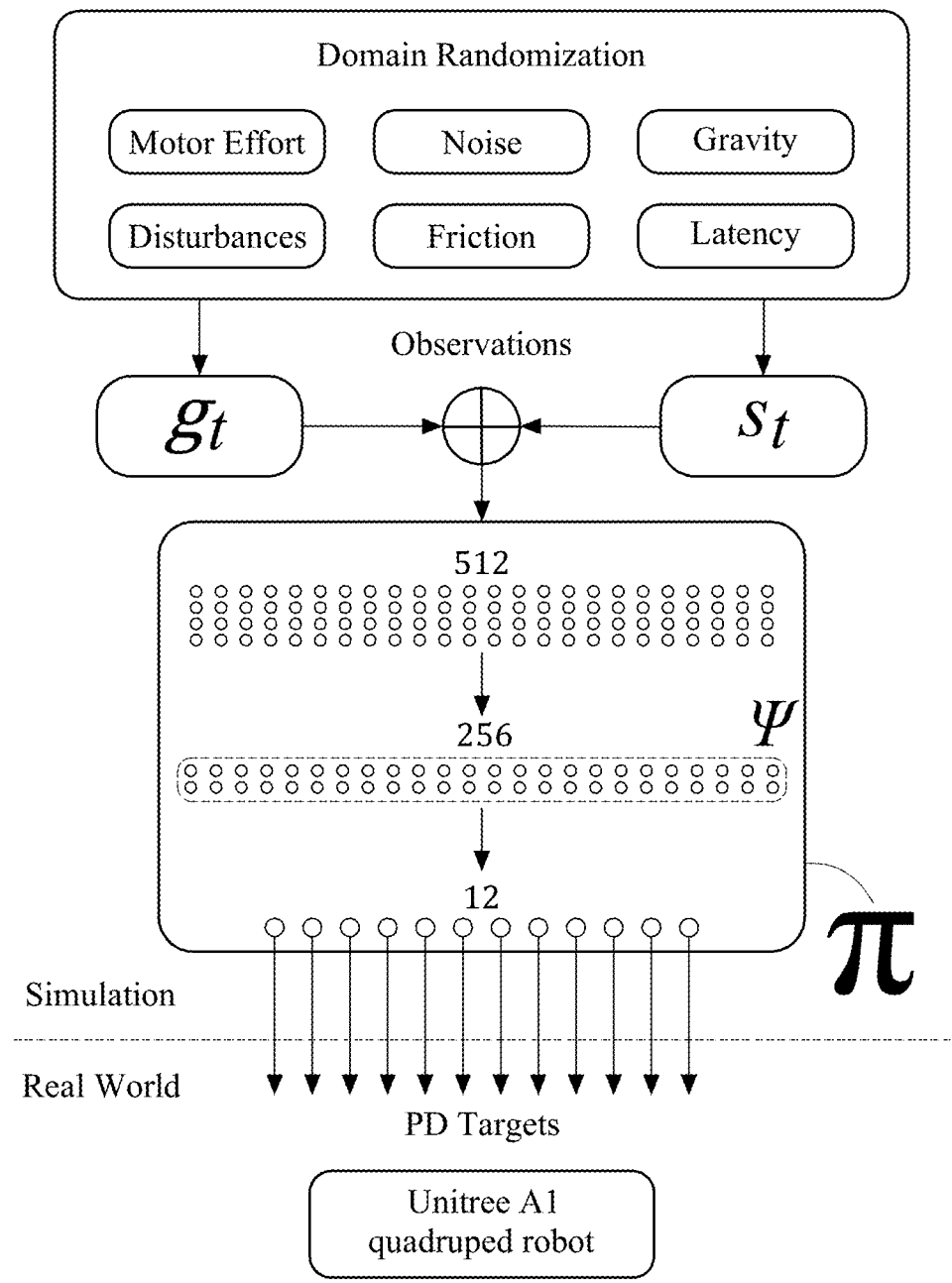
FIG. 2 is a schematic diagram of creating the library of independent locomotion policies.

The step A5 is to train with reinforcement learning (RL), and to perform domain randomization with physics parameters. FIG. 2 is a schematic diagram of creating the library of independent locomotion policies corresponding to step A5.

The reinforcement learning doesn't require an accurate model of the system dynamics to achieve robust locomotion, however, it is necessary to carefully design a reward function that incentivizes the intended behavior and punishes undesired motions. Specifically, a policy π is learned by maximizing the expected return, as shown in FIG. 2 and Equation 1 below:

$$J(\pi) = \mathbb{E}_{\tau \sim p(\tau|\pi)} [\Sigma_{t=0}^{T} \gamma^t r_t]$$ (Equation 1)

where the neural network model mentioned in step A3 is referred to here as policy π, and the locomotion policy or gait policy mentioned later is its synonym. $p(\tau|\pi)$ is the likelihood of a trajectory τ given the policy π, where the trajectory is the process of the agent from the beginning (t=0) to the end (t=T). If the agent falls and hits the ground in the process of [0, T], it means that the trajectory ends early. $\Sigma_{t=0}^{T} \gamma^t r_t$ is the accumulated reward collected during the trajectory. $r_t$ denotes the reward collected at time t∈T, where T denotes the length of time the agent survives in the current motion, and γ∈[0, 1] represents the discount factor for future rewards. The policy is trained to learn an action distribution by imitating a reference motion clip. The input of the policy consists of the agent's state $s_t$ and the reference motion $g_t$. The policy is modeled as a feed-forward network that outputs the action distribution $a_t$ at given the current state $s_t$ and reference motion $g_t$, i.e., $\pi(a_t|s_t, g_t)$.

From here, the policy is transferred from the simulation to the real-world by applying extensive domain randomization of the physics parameters and adding other disturbances during the training process, such as motor effort, noise, gravity, disturbance, friction, latency as shown in the upper part of FIG. 2. This improves the inherent robustness of each policy and minimizes the performance gap between the simulation and the real-world setting. In an embodiment, the available DR parameters are shown in Table 1 below.

TABLE 1 parameters for domain randomization with uniform sampling

| Parameter | Range | Type |
| --- | --- | --- |
| Gravity | [0.8, 1.2] | Scaling |
| Action Noise | [−0.03, 0.03] | Additive |
| Observation Noise | [−0.03, 0.03] | Additive |
| Rigid Bodies Mass | [0.85, 1.15] | Scaling |
| Ground Friction | [0.25, 1.5] | — |
| Observation Latency | [0.0, 0.020] s | — |
| Stiffness Gain (PD Controller) | [45, 75] | — |
| Damping Gain (PD Controller) | [0.9, 1.8] | — |

With careful selection and application of the DR parameters described in Table 1, a sim-to-real deployment of the independent locomotion policies with no failures may be ensured. Repeating the process for every desired gait results in a library of robust yet independent policies, each applicable to the real robot.

As shown in the lower part of FIG. 2, an embodiment of the present disclosure uses Unitree A1 quadruped robot, which has 12 joints actuated via a PD controller.

Multiple proportional-derivative control parameters required by the controller correspond to the 12 neurons in the output layer of the policy Tr. During the training stage, the simulated agent matches the configurations and properties of the real robot. The observation space of the policy is composed of the state s t and the reference motion g t. The state $s_t \in \mathbb{R}^{102}$ includes state information from the current and past two timesteps of the agent. A single state is composed of 12 joint angles, the orientation and angular velocities (6), a binary indicator of the contact for each foot (4), and the previous actions of the policy (12). The reference motion $g_t \in \mathbb{R}^{56}$ contains the target poses from the motion capture data at 4 future time steps, up to one second in the future. It functions as an implicit phase variable by modulating the near future targets of the agent. When searching for the best destination phase of the queued policy, the queued reference motion data in the time axis may be shifted.

The gait policies are trained following the imitation learning objective from "X. B. Peng, P. Abbeel, S. Levine, and M. van de Panne, Deepmimic: Example-guided deep reinforcement learning of physics-based character skills, ACM Trans. Graph., vol. 37, no. 4, July 2018", with the Proximal Policy Optimization (PPO) clip loss parameters described in Table 2 below.

TABLE 2 hyper-parameters for training a locomotion policy with PPO.

| Parameter | Value |
| --- | --- |
| Number of Environments | 4096 |
| Sequence Length | 24 |
| Sequences per Environment | 4 |
| Policy Optimization Iterations | 5 |
| PPO Batch Size | 12288 |
| Adam Optimizer LR | $3 \times 10^{-4}$ |
| Discount factor γ | 0.95 |
| Generalized Advantage Estimation λ | 0.95 |
| PPO Clip threshold | 0.2 |
| KL threshold | 0.008 |
| Entropy coefficient | 0.0 |

The present disclosure develops RL training environment using the simulator Isaac Gym, which can accelerate the training by instancing several parallel environments in a single physics scene and exposing the simulation states via a PyTorch-like API. With the above implementation, the training process of a single locomotion policy takes less than one hour of wall clock time. In an embodiment, the computing device is equipped with Intel i7-11800H 2.3 GHz cores and RTX 3070 8 GB, but not limited to the hardware and the configuration described above. The trained policies can be deployed with the real robot in a zero-shot manner.

In step A7, the computing device determines whether the training of the models of all locomotion gaits are completed. If the determination is "yes", step A9 is performed next. Step A9 is to create a library with a plurality of gait policies. If the determination is "no", the next step returns to step A5 to continue the training of the model of the next locomotion gait.

As described above, the flow shown in FIG. 1 may create a library with independent locomotion policies.

Using reinforcement learning in simulation, a library of independent policies is collected by imitating the reference motions of a set of desired locomotion gaits. A locomotion policy is represented by a feedforward neural network architecture. By using domain randomization, it is ensured that each locomotion policy can be deployed and executed with real-world robots. Each locomotion policy is considered a periodic controller, that is capable of recovering from unstable states within an unspecified tolerance.

Figure 3:
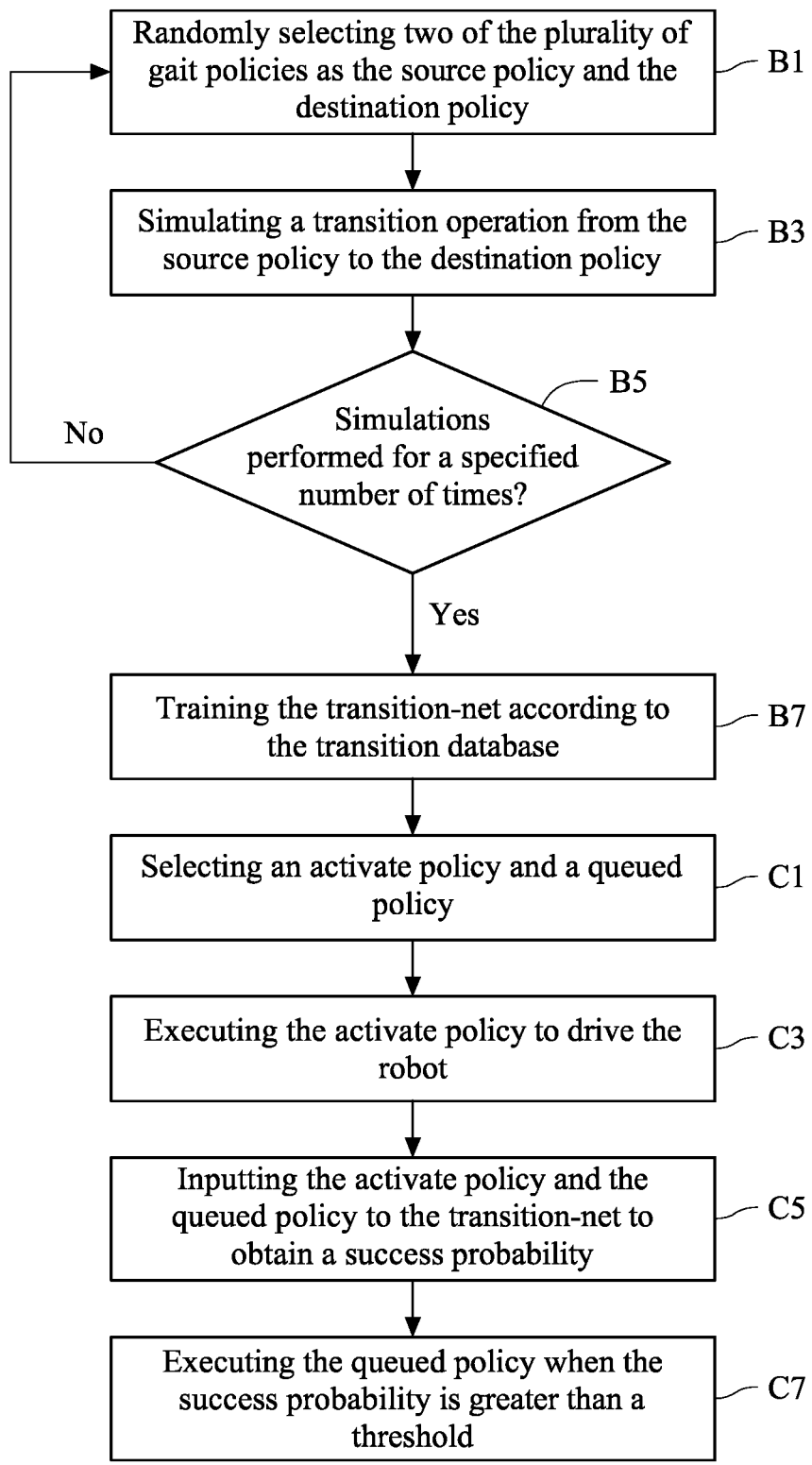
FIG. 3 is a flowchart of a transition method of locomotion gait of robot according to an embodiment of the present disclosure.

FIG. 3 is a flowchart of a transition method of locomotion gait of robot according to an embodiment of the present disclosure, and includes steps B1 to B7 performed by the computing device, and steps C1 to C7 performed by a meta-controller. In an embodiment, the meta-controller may adopt one of the following examples: application specific integrated circuit (ASIC), digital signal processor (DSP), field programmable logic gate Array (FPGA), system-on-a-chip, (SOC), and deep learning accelerator. The present disclosure is not limited to the above examples.

In step B1, two of the plurality of gait policies are randomly selected as the source policy and the destination policy. In step B3, a transition operation from the source policy to the destination policy is simulated.

With a library of robust but independent policies, an embodiment of the present disclosure introduces transitions between policies via the switching technique proposed by "J. H. Soeseno, Y.-S. Luo, T. P.-C. Chen, and W.-C. Chen, Transition motion tensor: A data-driven approach for versatile and controllable agents in physically simulated environments, in SIGGRAPH Asia 2021 Technical Communications, 2021, pp. 14". Each policy is considered a robust periodic controller capable of recovery from unstable states within an unspecified tolerance. For example, when the agent stumbles due to external perturbations, the policy acts to prevent its collapse and resumes its normal periodic motion afterward. Given this behavior, when the agent is executing an active policy, it is possible to instantaneously switch the execution to a different policy at a particular destination phase. With proper timing of the switch and choice of the destination phase, the new active policy takes control, and the robot remains stable.

Figure 4:
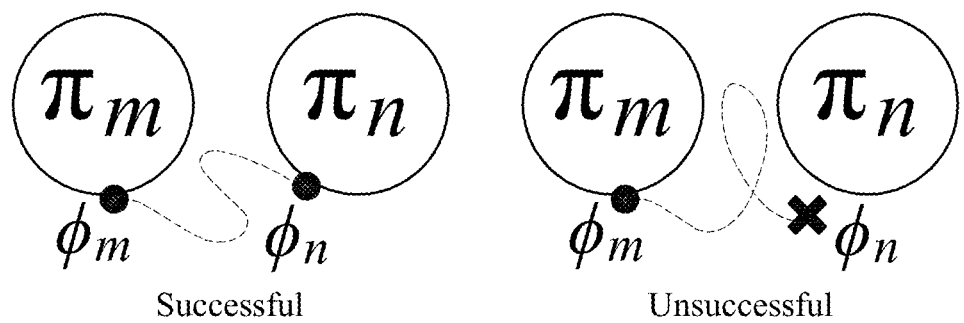
FIG. 4 is an example diagram showing successful transition and fail transition.

In view of the above, it needs to consistently identify transition configurations that yield successful outcomes, i.e. where the agent remains stable after the transition. FIG. 4 is an example diagram showing successful transition and fail transition, where $\pi_m$ denotes the source policy, $\pi_n$ denotes the destination policy, $\phi_m$ denotes a phase in the source policy, and $\phi_n$ denotes a phase in the destination policy. The agent executing the policy may perform a periodic motion. The periodic motion includes a plurality of phases, and each phase is equivalent to a state of the agent performing the periodic motion. A successful transition refers that the destination phase of the agent is stable, and a fail transition refers that the destination phase of the agent does not exist in the target policy. In an embodiment, the success or failure of the transition may be determined according to whether a specified part (e.g., the back) of the agent touches the ground.

In step B5, the computing device determines whether the simulations of the transitions have been performed a specified number of times. If the determination is "yes", step B7 is performed next. If the determination is "no", the next step returns to step B3 for generating another transition sample. In step B7, the computing device trains the transition-net according to the transition database.

The transition-net proposed in an embodiment of the present disclosure is trained in a supervised manner with millions of transition samples collected from simulation with domain randomization. In other words, the specified number mentioned in step B5 is at the level of millions. These transition samples are stored in the transition database. Each sample contains paired labels of transition configuration and their corresponding outcome, where the source and destination policies are uniformly sampled from the library. Since the random switching strategy used to collect the samples introduce an imbalanced number of failure and successful cases, an embodiment of the present disclosure sub-samples transition samples such that the number of success and failure samples are balanced.

In an embodiment of step B7, a transition function $f_\theta(\cdot)$ is formulated to map the transition configurations to their outcome, where $\theta$ represents the weights of a feed-forward neural network, called the transition-net. The transition outcome is denoted by the binary variable $\alpha \lfloor \{0,1\}$, and the transition configuration C is represented as a tuple of four elements, as shown in Equation 2 below. The transition function is a generalized definition of a function, and the transition-net proposed by the present disclosure is an implementation of the transition function.

$$C=(m,n,\psi_m,\phi_n) \quad \text{(Equation 2)}$$

where m and n are identifiers of the source and destination policy, respectively; $\psi_m$ is a high-dimensional vector denoting the latent state (also known as latent representations) of the source policy, and $\psi_n \in [0, 1)$ is the phase of the destination policy. Please refer to FIG. 2. In an embodiment, the latent state is the last hidden layer in the neural network model of the source policy, such as $\Psi$ with 256 neurons in FIG. 2.

To train the transition-net, in an embodiment, millions of transition samples in simulation are collected as the transition dataset. Using this transition dataset, the transition-net is trained in a supervised manner solving for a binary classification problem, where it aims to predict whether a transition configuration C would result in a successful outcome ($\alpha=1$) or a failure ($\alpha=0$).

In an embodiment, the transition-net is optimized for the binary cross-entropy (BCE) loss with a as the classification label y, as shown in Equation 3 below.

$$BCE=y\log(\hat{y})+(1-y)\log(1-\hat{y}) \quad \text{(Equation 3)}$$

where y denotes the recorded ground truth outcome, and $\hat{y}$ is the prediction of the transition-net.

In an embodiment, the transition-net is implemented as a feed-forward network with 128-64-32 neurons as the intermediate layers, with dropout (p=0.4) and Rectified Linear Unit (ReLU) activation functions applied after each layer except for the output layer, which uses a sigmoid. The neural network is trained for 100 epochs using a mini-batch of 128 samples, and the AdamW optimizer with a learning rate of 5e-4.

Figure 5:
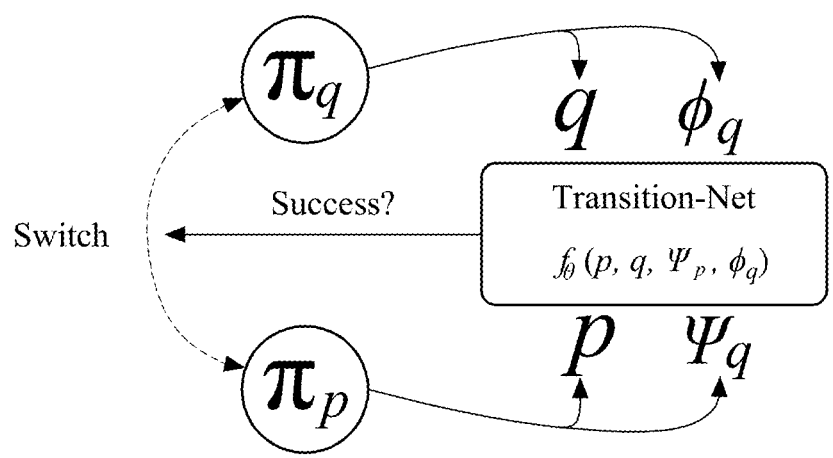
FIG. 5 is a schematic diagram of the operation of the meta-controller.

As described above, in the process of B1 to B7, a dataset is collected by executing random transitions between every policy pair available in the policy library. Each data sample consists of the following properties: an identifier of the source policy, an identifier of the destination policy, the latent representations of the source policy taken from the last hidden layer, and a destination phase in the destination policy. Then, a binary classifier is trained to predict the success of a transition given the previously defined properties. Next, the meta-controller disposed on a real robot is employed to unify these independent policies. Please refer to steps C1 to C7 and FIG. 5. FIG. 5 is a schematic diagram of the operation of the meta-controller.

In step C1, the meta-controller selects an activate policy $\pi_p$ and a queued policy $\pi_q$. In step C3, the meta-controller executes the activate policy $\pi_p$ to drive the robot. In step C5, the meta-controller inputs the identifier p of the activate policy $\pi_p$ and the identifier q of the queued policy $\pi_q$ to the transition function $f_\theta$ to obtain a success probability. In step C7, the meta-controller executes the queued policy $\pi_q$ when the success probability is greater than a threshold.

To coherently unify all policies during deployment, an embodiment of the present disclosure constructs a meta-controller, which uses the transition-net $f_\theta$ to estimate transition scores. The meta-controller queries the transition-net $f_\theta$ to identify the best transition configurations. It is responsible for choosing, scheduling, and executing the policies deployed on the robot using the following elements:

An active policy $\pi_p$, which controls the robot by generating joint target angles actuated via PD control.

A queued policy $\pi_q$, to be switched for the active policy as soon as possible.

A transition function $f_\theta(\cdot)$ that provides transition score estimates given the current configuration. In an embodiment, the output of the transition-net is used as a scoring function, and the meta-controller only performs transitions when the score crosses the threshold, i.e., $f_\theta(C)>th$, where the threshold th is 0.95.

During runtime, it starts by defining an initial active policy that controls the robot. The active policy can be initialized to any policy available in the library. At some point in time, a request for a policy change happens, and a different policy from the library is queued. Once a policy is queued, the meta-controller recognizes that a switch should happen. At every time step (such as 30 Hz), the meta-controller queries the transition function $f_\theta(\cdot)$ and computes the transition score of switching the active policy for the queued policy. Note that the meta-controller searches over multiple destination phases when querying and choose the highest scoring one. When the transition score crosses a predefined threshold, the queued policy becomes active and takes control of the robot.

In view of the above, the present disclosure has the following contributions or effects. First, the present disclosure enables the creation of a library of locomotion gaits that can be robustly deployed with real world legged robots via gait transitions. Second, the present disclosure solves the scalability issue of existing methods by containing locomotion gaits in specialized, independent controllers. This allows the expansion of the gait library in an iterative manner, without affecting existing gaits or the need of retraining or fine-tuning.

What is claimed is:

1. A transition method of locomotion gait of a robot, wherein the robot has a plurality of joints and a meta-controller, and the method comprises:
    performing, by a computing device, a deployment procedure for a plurality of times, wherein each of the plurality of times comprises:
        randomly selecting two of a plurality of gait policies as a source policy and a destination policy, wherein each of the plurality of gait policy is a neural network model used to control the robot to perform a periodic motion with a plurality of phases; and
        simulating a transition operation from the source policy and the destination policy and recording a transition configuration and a transition result in a transition database, wherein the transition configuration comprises: an identifier of the source policy, an identifier of the destination policy, a latent state and one of the plurality of phases associated with the destination policy, and the latent state is a hidden layer of the neural network model corresponding to the source policy;
    training, by the computing device, a transition-net according to the transition database, wherein the transition-net is used to output a success probability according to the transition configuration; and
    performing, by the meta-controller, a plurality of operations, wherein the plurality of operations comprises:
        selecting two of the plurality of gait policies as an activate policy and a queued policy;
        executing the activate policy to drive the robot;
        inputting the activate policy and the queued policy to the transition-net to obtain the success probability; and
        when the success probability is greater than a threshold, executing the queues policy to drive the robot.

2. The transition method of claim 1, further comprising steps performed by the computing device, wherein the steps comprise:
    collecting a plurality of videos of a plurality of locomotion gaits in a real world;
    creating the neural network model corresponding to each of the plurality of locomotion gaits;
    training the neural network model by reinforcement learning, and performing a domain randomization with a plurality of physics parameters; and
    storing the neural network model into a library when a training of the neural network model corresponding each of the plurality of locomotion gaits is completed.

3. The transition method of claim 2, wherein the plurality of physics parameters comprises at least one of motor effort, noise, gravity, friction, disturbance, latency, and gain parameter of a proportional-derivative controller.

4. The transition method of claim 1, wherein the neural network model comprises an input layer, a plurality of middle layers and an output layer, wherein
    the input layer comprises a current state corresponding to a plurality of time points, the current state corresponding to each of the plurality of time points comprises an angle of the plurality of joints, a direction of the robot, an angular velocity of the plurality of joints, a binary indicator indicating whether a foot of the robot contacts a ground or not;
    the latent state is a last one of the plurality of middle layers;
    a number of a plurality of neurons of the output layer corresponds to a number of the plurality of joints, and the plurality of neurons is used to output a proportional-derivative control parameter.

5. The transition method of claim 1, wherein the neural network model is a feed forward neural network.

6. The transition method of claim 1, wherein
the transition-net is a feed forward neural network and comprises an input layer, a middle layer, and an output layer;
the middle layer comprises 128-64-32 neurons;
each of the input layer and the middle layer uses a rectified linear unit activation function; and
the output layer uses a sigmoid function.

7. The transition method of claim 1, wherein simulating the transition operation from the source policy and the destination policy uses an Issac Gym simulator.

* * * * *